United States Patent
Back

[11] Patent Number: 5,355,180
[45] Date of Patent: Oct. 11, 1994

[54] APPARATUS FOR AND METHOD OF A TELEVISION RECEIVER INCORPORATING AUDIO/VISUAL WARNING OF VIEWING DISTANCE AND AUDIO MESSAGE RECORD/PLAYBACK FEATURES

[75] Inventor: Woon G. Back, Kumi, Rep. of Korea
[73] Assignee: Goldstar Co., Ltd.
[21] Appl. No.: 992,121
[22] Filed: Dec. 17, 1992

[30] Foreign Application Priority Data

Dec. 19, 1991 [KR] Rep. of Korea ............ 91-23517

[51] Int. Cl.⁵ ............................................. H04N 5/44
[52] U.S. Cl. .................................. 348/734; 348/553; 348/818; 348/164
[58] Field of Search ............ 358/188, 183, 198, 194.1, 358/906; 348/734, 553, 818, 164, 563; H04N 5/64, 5/44, 5/445

[56] References Cited

U.S. PATENT DOCUMENTS

| | | | |
|---|---|---|---|
| 4,321,593 | 3/1982 | Ho et al. ........................ | 358/188 |
| 4,417,278 | 11/1983 | Hensleigh et al. .............. | 358/188 |
| 4,716,469 | 12/1987 | Kim et al. ...................... | 348/818 |
| 4,831,448 | 5/1989 | Park .............................. | 348/553 |
| 4,835,614 | 5/1989 | Ryu .............................. | 358/194.1 |
| 5,014,136 | 5/1991 | Sakai et al. .................... | 358/906 |

Primary Examiner—Mark R. Powell
Assistant Examiner—John W. Miller
Attorney, Agent, or Firm—Poms, Smith, Lande & Rose

[57] ABSTRACT

A viewing distance warning/sound recording apparatus for a television receiver and the method thereof, which can provide viewing distance warning by outputting a visible message for warning when a televiewer watches television at too near a distance as well as reproduce a specific message of the televiewer to others during his absence. The apparatus according to the present invention comprises a microcomputer, a sensing circuit for detecting if an object exists within a predetermined distance from a television screen under the control of the microcomputer and a sound processing circuit for recording and reproducing a sound according to control signals of the microcomputer. The apparatus also includes a key matrix having function keys for setting sound recording, message output and viewing distance warning modes, respectively. According to the present invention, the viewing distance warning message and the message notifying the sound recording mode are effected by on-screen display and the specific message to be taken to the others may be audibly produced.

6 Claims, 4 Drawing Sheets

APPARATUS FOR AND METHOD OF A TELEVISION RECEIVER INCORPORATING AUDIO/VISUAL WARNING OF VIEWING DISTANCE AND AUDIO MESSAGE RECORD/PLAYBACK FEATURES

BACKGROUND OF THE INVENTION

The present invention relates to eyesight protection/sound recording for a television receiver, and more particularly, to a viewing distance warning/sound recording apparatus and the method thereof by which a visible message previously recorded for eyesight protection can be outputted if an object is detected within a predetermined distance from a television screen and a specific message of a televiewer's can be recorded and reproduced to others during his absence.

DESCRIPTION OF THE PRIOR ART

The conventional eyesight protection circuit, as shown in FIG. 1, includes an oscillation section 1, an infrared-emitting section 2 for emitting infrared rays in accordance with the output of the oscillation section 1 and an infrared-receiving section 3 for receiving the infrared rays emitted by the infrared-emitting section 2 and then reflected from an object 4 existing within a predetermined distance from a television screen 2. The conventional eyesight protection circuit also includes an AND gate AD1 receiving the output of the oscillation section 1 and the output of the infrared-receiving section 4, and outputting a control signal as an object-detection signal.

In the conventional circuit constructed as above, the oscillation section 1 provides an oscillated frequency having a predetermined period and this oscillated frequency is supplied to the infrared-emitting section 2, causing it to emit the infrared rays.

Thereafter, if an object exists within the predetermined distance from the screen, the infrared rays emitted by the infrared-emitting section 2 are reflected from the object and is then incident upon the infrared-receiving section 3.

The output of the infrared-receiving section 3, as well as the output of the oscillation section 1, is fed to the AND gate AD1, the output of which is used as an object-detection signal.

That is, if an object exists within the predetermined distance from the screen, the infrared rays reflected from the object are received by the infrared-receiving section 3 and thus the output of the AND gate AD1 becomes 'HIGH'. This 'HIGH'-leveled output of the AND gate AD1 causes the power supply to a television circuit to be cut-off or causes video blanking to be effected, bypassing luminance signal to ground, so that watching television at too near a distance can be prevented and thus eyesight protection can be achieved.

However, such conventional eyesight protection circuit has the disadvantage that it is apt to operate to cut off the power supply or to effect video blanking even when an object momentarily passes in front of the screen, causing great inconvenience to the televiewer.

SUMMARY OF THE INVENTION

The present invention has been made to overcome the problems involved in the prior art and it is an object of the present invention to provide a viewing distance warning/sound recording apparatus for a television receiver and the method thereof which is capable of outputting a visible message for viewing distance warning on the screen, thereby effecting viewing distance warning without causing much inconvenience where that the televiewers (especially children) watch television at too near a distance.

It is another object of the present invention to provide a viewing distance warning/sound recording apparatus for a television receiver and the method thereof which enables a specific message of the televiewer's to be recorded and then reproduced for others during his absence.

In order to achieve the above objects, there is provided a viewing distance warning/sound recording apparatus for a television receiver which comprises:

a controller operatively connected to said television receiver;

a key matrix operatively connected to said controller, said matrix including a sound recording key, a sound control key and a message identification key;

a distance sensor operatively connected to said controller; and a sound processor operatively connected to said controller;

a) said controller detecting the entry of said a sound recording key and responsively performing on-screen display indicating a sound recording mode to effect the sound recording of a message for a predetermined time using said sound processor;

b) said controller detecting entry of said sound control key and responsively setting either a message output mode or a viewing distance warning mode;

c) said distance sensor detecting if an object exists within a predetermined distance from a television screen when the viewing distance warning mode is set at step b) and if the object is detected, outputting a specific message recorded at step a); and d) said controller detecting the entry of said message identification key when the message output mode is set at step b) and if the message identification key is entered, outputting a specific message recorded at step a).

Also, in order to achieve the above objects, there is provided a viewing distance warning/sound recording method for a television receiver which comprises the steps of:

a) detecting the entry of a sound recording key and if the sound recording key is entered, performing on-screen display(OSD) notifying that the present mode is a sound recording mode, to effect the sound recording for a predetermined time;

b) detecting the entry of a sound control key and if the sound control key is entered, setting either a message output mode or a viewing distance warning mode;

c) detecting if an object exists within a predetermined distance from a television screen when the viewing distance warning mode is set at the step b) and if the object is detected, outputting a viewing distance warning message recorded at the step a); and d) detecting the entry of a message identification key when the message output mode is set at the step b) and if the message identification key is entered, outputting a specific message recorded at the step a).

BRIEF DESCRIPTION OF THE DRAWINGS

The above objects and other advantages of the present invention will become more apparent by describing the preferred embodiment of the present invention with reference to the accompanying drawings, in which.

DETAILED DESCRIPTION OF THE PREFERRED EMBODIMENT

Figure 1:
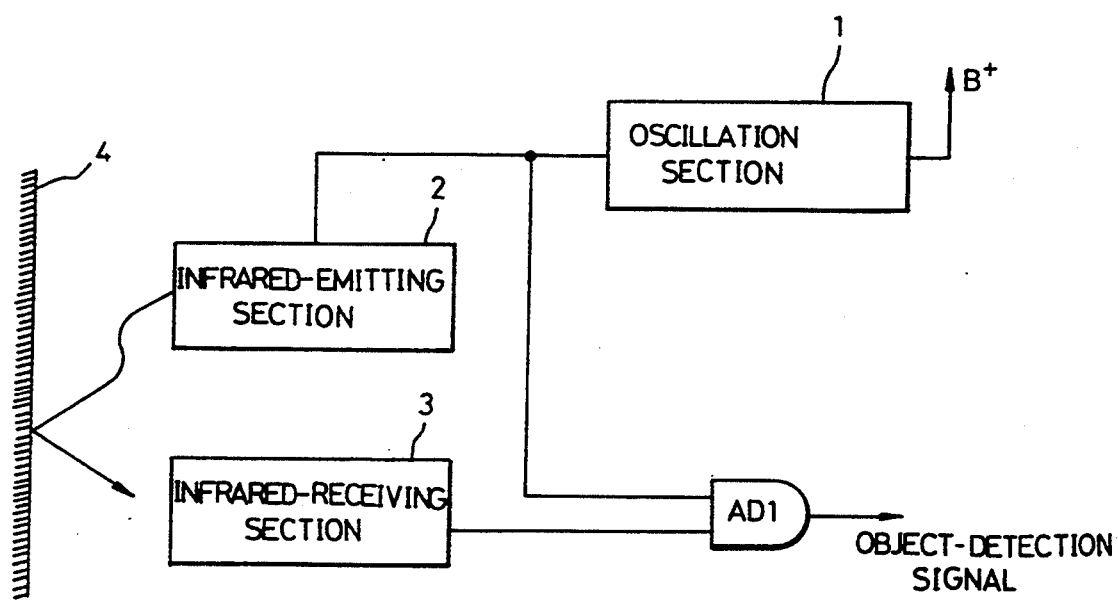
FIG. 1 is a schematic diagram of the conventional viewing distance warning circuit for a television receiver.
Figure 2:
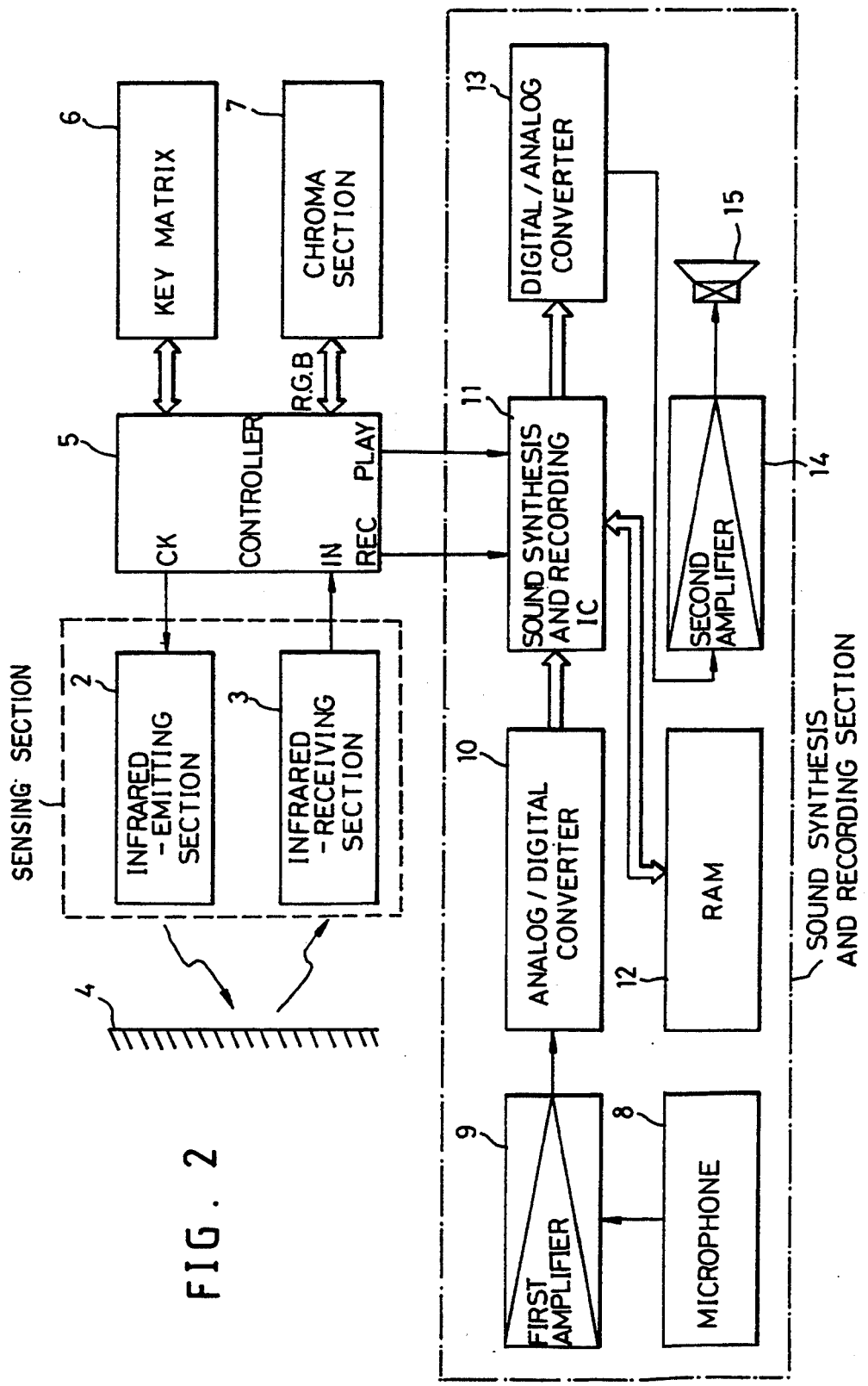
FIG. 2 is a schematic diagram of an embodiment of the viewing distance warning/sound recording apparatus according to the present invention.

Referring to FIG. 2 showing an embodiment of the viewing distance warning/sound recording apparatus according to the present invention, a microcomputer 5 is used as a system controller.

A sensing section is composed of an infrared-emitting section 2 the operation of which is controlled according to a clock signal outputted from the microcomputer 5 to emit infrared rays and an infrared-receiving section 3 which receives the infrared rays emitted from the infrared-emitting section 2 and then reflected from an object 4 existing within a predetermined distance from the television screen.

A sound processing section includes a microphone 8 for entering a voiced sound as an analog signal in a sound recording mode, a first amplifier 9, an analog-to-digital (A/D) converter 10 for converting the analog signal entered from the microphone 8 into a digital signal, a speech synthesis/recording IC 11 for performing sound recording and reproducing according to first and second control signals from the microcomputer 5, and a random access memory(RAM) 12 for storing the digital signal. The sound processing section also includes a digital-to-analog(D/A) converter 13 for converting the digital signal outputted from the speech synthesis/recording IC 11 into an analog signal, a second amplifier 14 and a speaker 15 for outputting the converted analog signal.

Now, the operation of the viewing distance warning-/sound recording apparatus according to the present invention will be described in detail.

Referring to FIG. 2, a speech synthesis/recording IC 11 performs sound recording or reproducing in accordance with a first control signal (i.e., recording signal) REC or a second control signal (i.e., reproducing signal) PLAY from the microcomputer 5.

When the recording signal REC from the microcomputer 5 becomes 'HIGH' and is supplied to the speech synthesis/recording IC 11, the IC is set to be in a recording mode. Thus, the analog signal entered from the microphone 8 is amplified by the first amplifier 8, converted into a digital signal by the A/D converter 10, and then stored in the RAM 12.

Meanwhile, when the reproducing signal PLAY from the microcomputer 5 becomes 'HIGH' and is supplied to the speech synthesis/recording IC 11, the IC 11 is set to be in a reproducing mode, and the digital signal stored in the RAM 12 is outputted and converted into an analog signal by the D/A converter 13. This analog signal outputted from the D/A converter 13 is amplified by the second amplifier and outputted through the speaker 15, being reproduced as a sound.

Figure 3A:
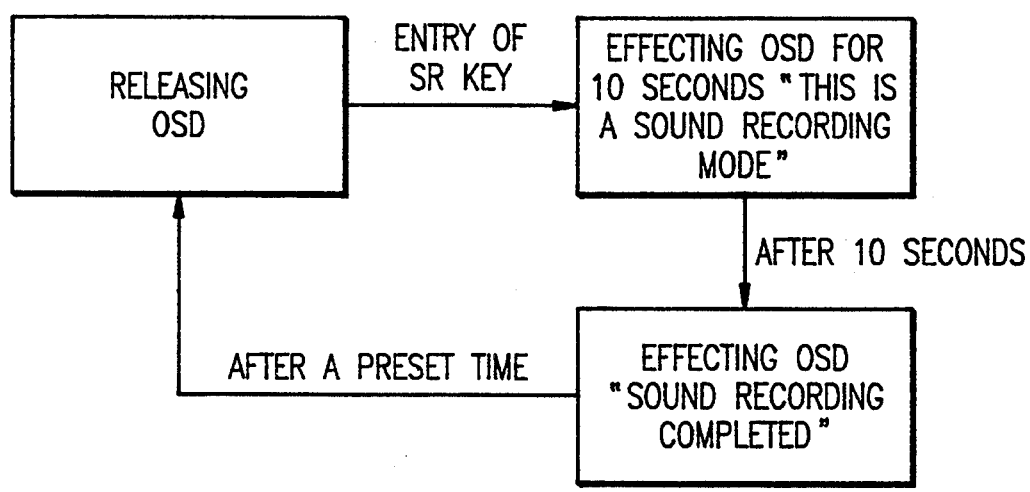
FIGS. 3A and 3B are views for explaining the states of performing OSD by the viewing distance warning-/sound recording method according to the present invention.

Referring to FIGS. 2 and 3A, if the sound recording(SR) key in the key matrix 6 is entered, the microcomputer 5 outputs the 'HIGH'-leveled recording signal, causing the speech synthesis/recording IC 11 to be in the recording mode. At the same time, the microcomputer 5 controls a chroma section 7 to perform the OSD notifying that the present mode is a sound recording mode(for example, OSD for "THIS IS A SOUND RECORDING MODE.") for a predetermined time (for example, for about 10 seconds). Thereafter, the microcomputer 5 performs reverse counting of the predetermined time by driving a built-in timer. After the predetermined time elapses, the microcomputer 5 notifies completion of the sound recording and then releases the OSD. The predetermined recording time as above is determined depending on the sampling frequency of the A/D converter 10 and the size (capacity) of the RAM 12.

Figure 3B:
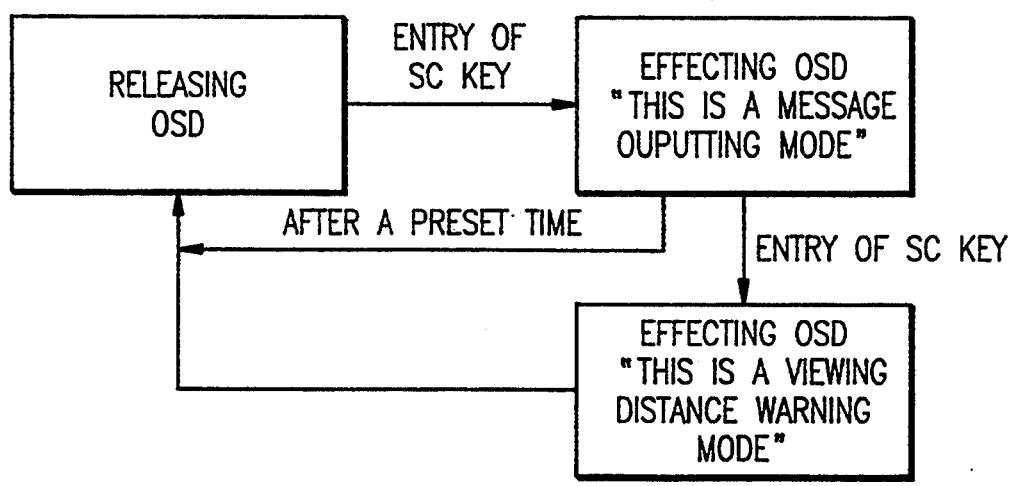

Meanwhile, it can be selected by entering a sound control(SC) key whether the recorded sound is to be used as a viewing distance warning message or a specific message of the televiewer to be taken to the others during his absence as shown in FIG. 3B which shows examples for performing the OSDs by means of the sound control (SC) key.

Figure 4:
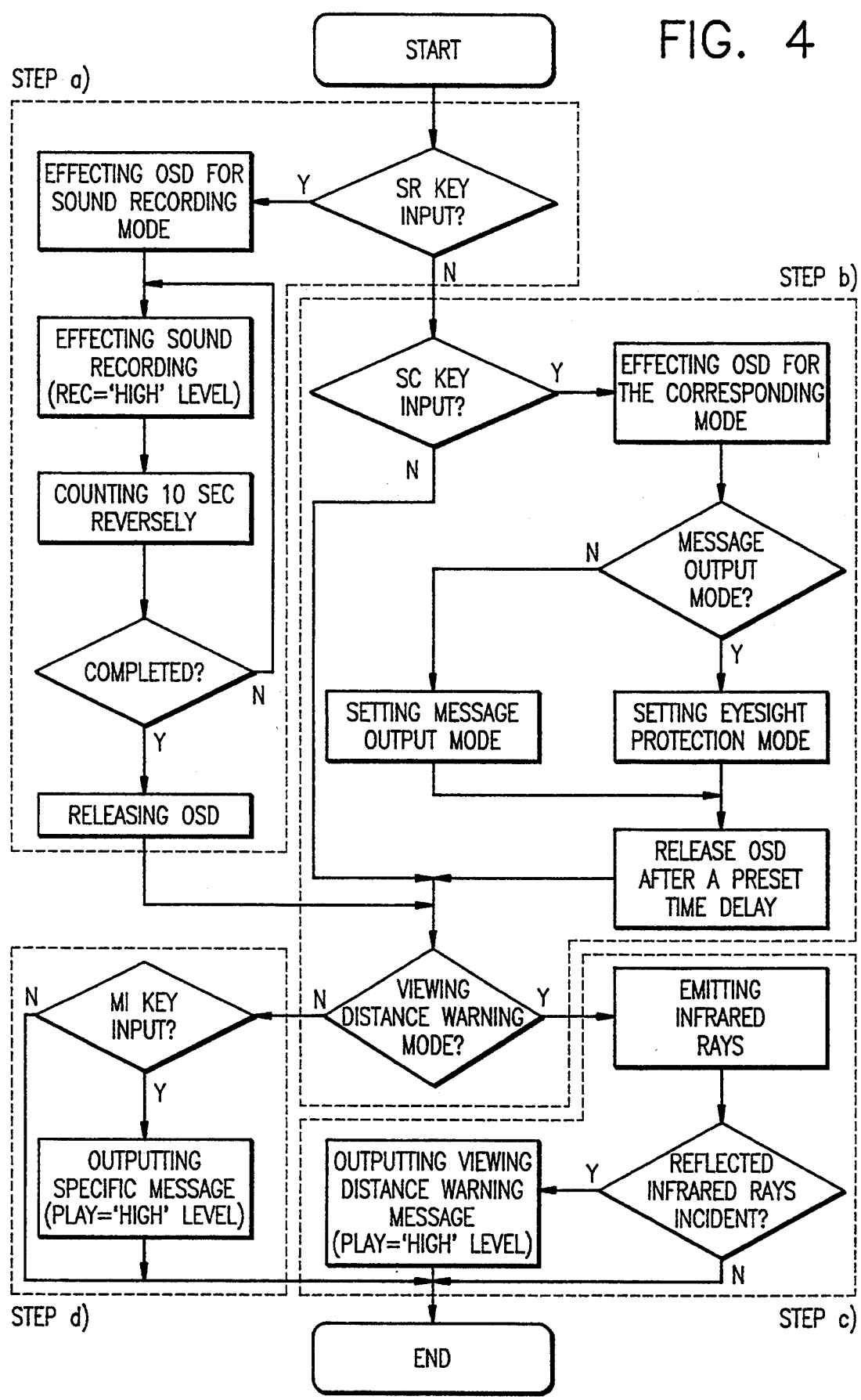
FIG. 4 is a flow chart for explaining the eyesight protection/sound recording method according to the present invention.

The above-described function performed by the microcomputer 5 will now be explained in more detail with reference to FIG. 4.

At first, the microcomputer 5 detects if the sound recording (SR) key is entered and performs the OSD for "THIS IS A SOUND RECORDING MODE" when the SR key is entered. The microcomputer 5 then outputs the recording signal of a 'HIGH' level to the speech synthesis/recording IC 11 for the predetermined time (about 10 seconds), causing the IC 11 to perform sound recording in association with the microphone 8, the first amplifier 9 and the A/D converter 10. Also, the microcomputer 5 counts reversely the predetermined time and then releases OSD after the predetermined time elapses.

Meanwhile, in case that the SR key is not entered, then the message output mode and the viewing distance warning mode are selectively set by entering (i.e., toggling) the sound control(SC) key.

When the viewing distance warning mode is selected by means of the SC key, the microcomputer 5 outputs a clock(carrier) signal to the infrared-emitting section 2, causing the section 2 to emit the infrared rays and detects if the infrared rays reflected from an object are received by the infrared-receiving section 3. If so, the microcomputer 5 determines that an object exists within the predetermined distance from the screen and then outputs the viewing distance warning message.

Also, when the message output mode is selected by means of the SC key, the microcomputer 5 detects the entry of the message identification (MI) key and if the MI key is entered, the microcomputer 5 controls the sound processing section to reproduce the specific message previously recorded for the predetermined time.

From the foregoing, it will be apparent that the present invention provides the advantages that it can provide viewing distance warning for the televiewers, especially children by outputting a visible message for warning when they watch television at too near a distance from the screen, and it can render a great convenience of life since a specific message previously recorded by the televiewer can be reproduced the to others during his absence.

While the present invention has been described and illustrated herein with reference to the preferred embodiment thereof, it will be understood by those skilled in the art that various changes in form and details may be made therein without departing from the spirit and scope of the invention.

What is claimed is:

1. A viewing distance warning and sound recording method for a television receiver, comprising the steps of:

a) detecting the entry of a sound recording key and if the sound recording key is entered, performing on-screen display notifying that the present mode is a sound recording mode, to effect the sound recording for a predetermined time;
    b) detecting the entry of a sound control key and if the sound control key is entered, setting either a message output mode or a viewing distance warning mode;
    c) detecting if an object exists within a predetermined distance from a television screen when the viewing distance warning mode is set at the step b) and if the object is detected, outputting a viewing distance warning message recorded at the step a); and
    d) detecting the entry of a message identification key when the message output mode is set at the step b) and if the message identification key is entered, outputting a specific message recorded at the step a).

2. A viewing distance warning and sound recording method as claimed in claim 1, wherein in the viewing distance warning mode, detection of the existence of the object is effected by emitting and receiving infrared rays.

3. A viewing distance warning and sound recording apparatus for a television receiver, comprising:
    a controller operatively connected to said television receiver;
    a key matrix operatively connected to said controller, said matrix including a sound recording key, a sound control key and a message identification key;
    a distance sensor operatively connected to said controller; and
    a sound processor operatively connected to said controller;
    a) said controller including means for detecting the entry of a sound recording key and responsively performing on-screen display and for entering a sound recording mode to effect the sound recording of a message for a predetermined time using said sound processor;
    b) said controller including means for detecting entry of said sound control key and responsively and selectively setting either a message output mode or a viewing distance warning mode;
    c) said distance sensor including means for detecting if an object exists within a predetermined distance from a television screen when the viewing distance warning mode is set at step b) and if the object is detected, outputting a specific message recorded at step a); and
    d) said controller further including means for detecting the entry of a message identification key when the message output mode is set at step b) and if the message identification key is entered, outputting a specific message recorded at step a).

4. An apparatus as claimed in claim 3, wherein said distance sensor further includes:
    an infrared-emitter for emitting infrared rays under the control of said controller; and
    infrared-receiver for receiving said infrared rays emitted from said infrared-emitter if said rays are first reflected from said object existing within said predetermined distance from said television screen.

5. An apparatus as claimed in claim 3, wherein said sound processor includes:
    a microphone for entering sound as an analog signal in said sound recording mode;
    an analog-to-digital converter for converting said analog signal entered from said microphone into a digital signal;
    a speech synthesis/recording means for performing sound recording and reproducing according to control signals from said controller;
    a random access memory for storing said digital signal converted by said analog-to-digital converter;
    a digital-to-analog converter for converting said digital signal from said speech synthesis/recording means into said analog signal; and
    a speaker for outputting said analog signal from said digital-to-analog converter.

6. A viewing distance warning and sound recording apparatus for a television receiver, comprising:
    a controller operatively connected to said television receiver;
    a key matrix operatively connected to said controller, said matrix including a sound recording key, a sound control key and a message identification key;
    a distance sensor operatively connected to said controller;
    said distance sensor including an infrared-emitter for emitting infrared rays under the control of said controller; and
    infrared-receiver for receiving said infrared rays emitted from said infrared-emitter if said rays are first reflected from said object existing within said predetermined distance from said television screen; and
    a sound processor operatively connected to said controller;
    a) said controller including means for detecting the entry of a sound recording key and for entering a sound recording mode to effect the sound recording of a message for a predetermined time using said sound processor;
    b) said controller including means for detecting entry of said sound control key and responsively and selectively setting either a message output mode or a viewing distance warning mode;
    c) said distance sensor including means for detecting if an object exists within a predetermined distance from a television screen when the viewing distance warning mode is set at step b) and if the object is detected, outputting from said sound processor a specific message recorded at step a; and
    d) said controller further including means for detecting the entry of a message identification key when the message output mode is set at step b) and if the message identification key is entered, outputting from said sound processor a specific message recorded at step a).

* * * * *